Sept. 24, 1957　　　　　D. D. POST　　　　　2,807,475
VEHICLE SUSPENSION AND STABILIZING SYSTEM
Filed Aug. 2, 1955　　　　　　　　　　4 Sheets-Sheet 1
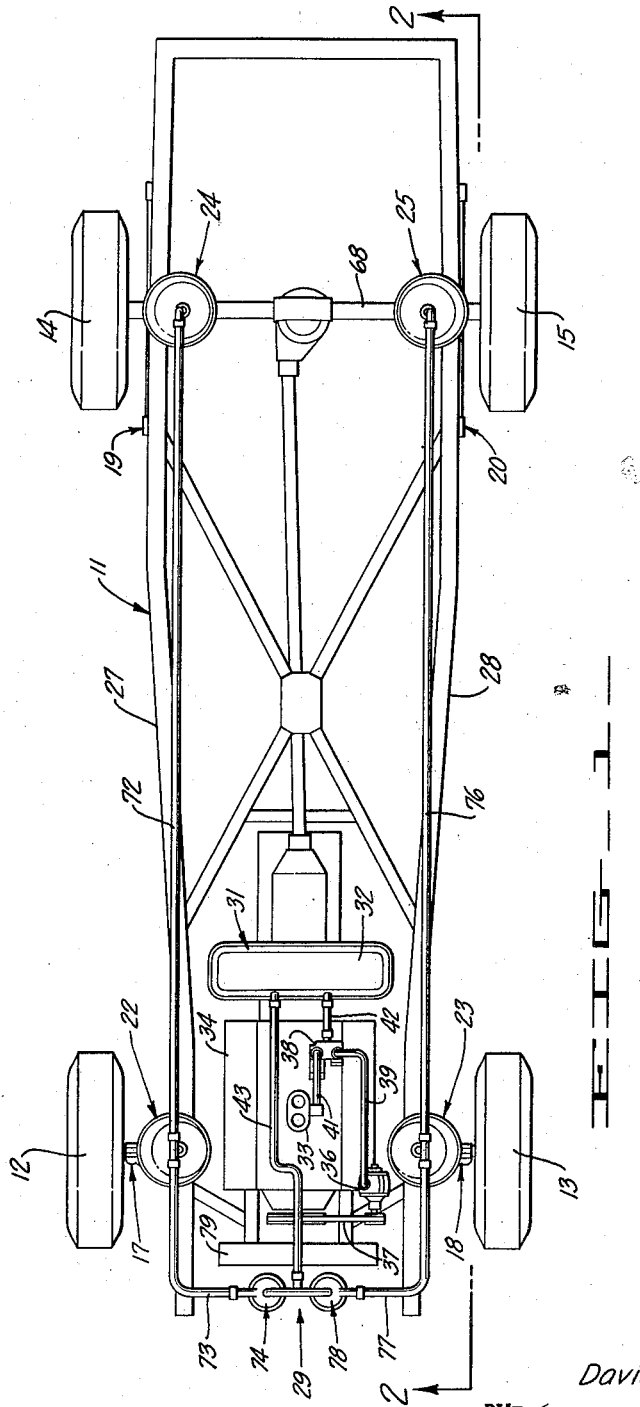
INVENTOR.
David D. Post

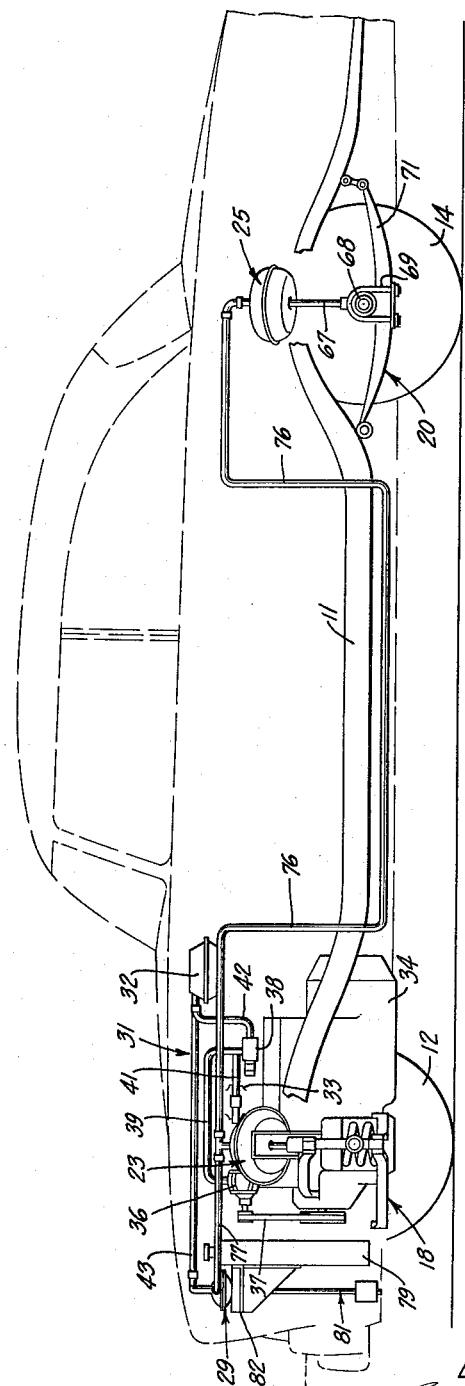

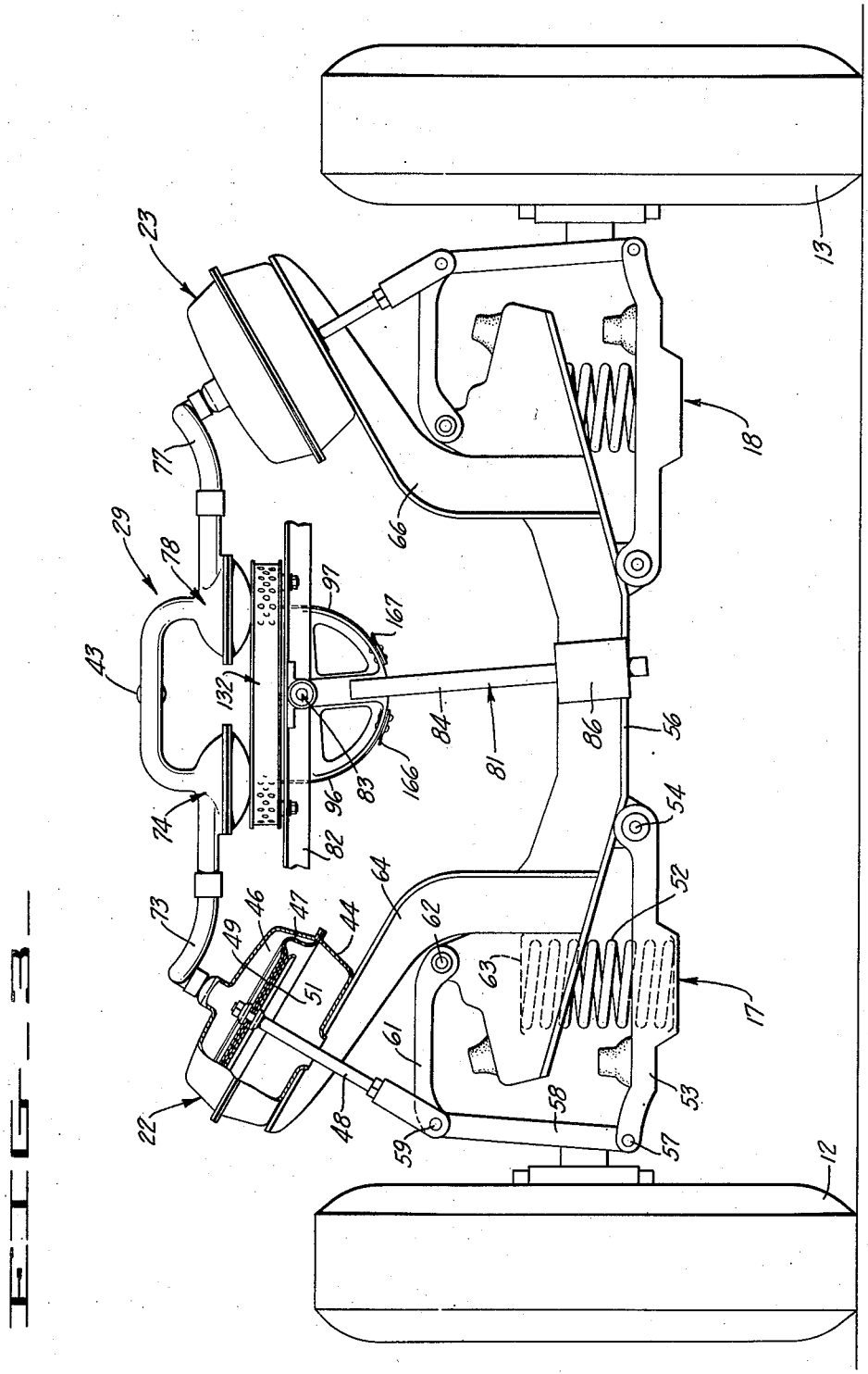

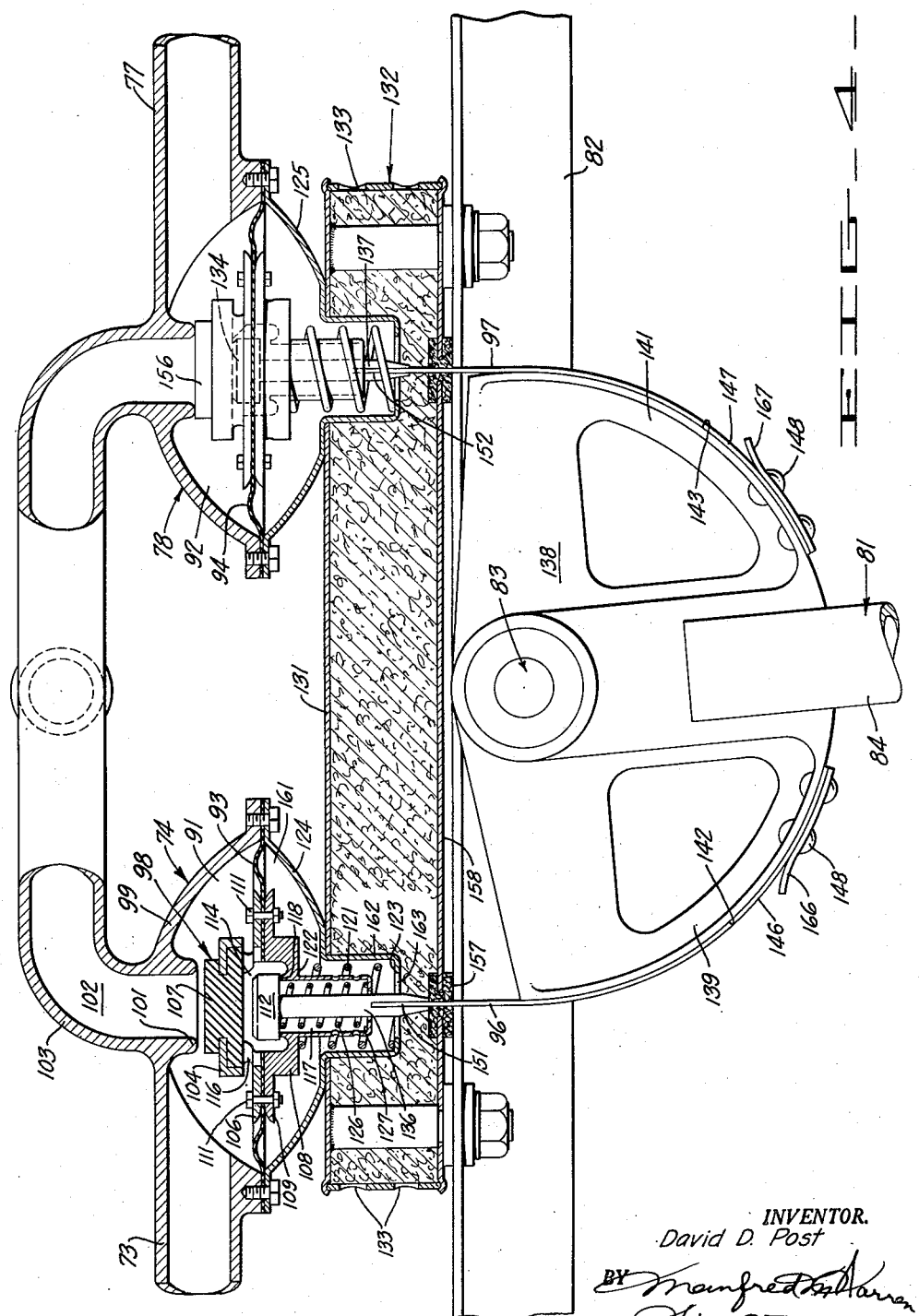

United States Patent Office 2,807,475
Patented Sept. 24, 1957

2,807,475
VEHICLE SUSPENSION AND STABILIZING SYSTEM

David D. Post, San Pablo, Calif.

Application August 2, 1955, Serial No. 526,029

11 Claims. (Cl. 280—112)

The invention relates to suspension mechanisms for automotive vehicles and more particularly to those mechanisms intended to effect a righting or leveling action on the vehicle when rounding a turn or when the vehicle is subjected to crosswind or the like.

An object of the present invention is to provide a vehicle suspension system of the character described which will embody means functioning to pull down on and compress the spring suspension for the vehicle chassis on the inside of the curve so as to pull downward on the chassis side to the inside of the turn to counteract the elevating force of the centrifugal action and thereby control the poise of the vehicle and also to lower its center of gravity while going through the turn.

Another object of the present invention is to provide a vehicle suspension system of the character above which is activated by a vacuum power source readily obtainable from the internal combustion engine of the automotive vehicle and controlled by a pendulum operated full floating valve system which is constantly and most sensitively responsive to a change in direction of movement of the vehicle and which will apply just the proper amount of force to the spring suspension of the vehicle to obtain the controlled poise above noted.

A further object of the present invention is to provide a vehicle suspension system of the character above which is composed of a minimum number of sturdily formed parts which are incorporated in a design requiring a minimum amount of relative movement between the parts with the result that the mechanism of the present invention will be subject to minimum wear and deterioration in use and will provide a long and trouble-free life.

Still another object of the present invention is to provide a control apparatus of the character described which may be applied to existing types of vehicle suspension systems.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings, Figure 1 is a plan view of a vehicle suspension system constructed in accordance with the present invention.

Figure 2 is a vertical cross-sectional view of the suspension system taken substantially on the plane of line 2—2 of Figure 1, portions of the automotive vehicle being shown in phantom lines.

Figure 3 is a front elevation on an enlarged scale of the vehicle suspension system.

Figure 4 is a front elevation, partially in section, of the valve control unit of the system, also taken on an enlarged scale.

The vehicle suspension system of the present invention consists briefly of a vehicle chassis 11, including the customary transversely spaced forward and rearward wheels 12, 13, 14 and 15, and resilient suspensions 17, 18, 19 and 20; means, here consisting of four pneumatic actuators 22, 23, 24 and 25, cooperating with the resilient suspensions 17—20 for selectively controlling the vertical spacing between the chassis and the wheels at the opposite sides 27 and 28 of the chassis; and means, here in the form of a pendulum operated valve system 29 and fluid power source 31, responsive to the rate of change of direction of movement of the vehicle to operate the actuators in a manner lowering the chassis on the inside of the curve constituting the change in direction of movement of the vehicle.

In accordance with the present invention, the actuators and spring suspension means are arranged to compress the springs so as to lower either transverse side 27 or 28 of the chassis, thus not only effecting a righting or leveling action of the vehicle but also a lowering of the center of gravity of the vehicle while going through a turn and thereby substantially increasing its stability on the road.

As another feature of the present invention the actuation of the system is effected by a vacuum source such as is conveniently obtainable from the intake manifold of the internal combustion engine of the automotive vehicle. A vacuum power source, such as used for vacuum operated vehicle brakes, is quite satisfactory for present purposes. Such a system customarily includes a reservoir or storage container 32 which is appropriately connected to the intake manifold 33 of the engine 34 and also to a vacuum pump 36 which may be driven from the fan belt 37 of the engine, the manifold 33 and pump 36 being connected to the reservoir 32 through a suitable 2-way or dual check valve structure 38. As it will be best seen in Figures 1 and 2, the pump 36 and the intake manifold 33 are connected to the 2-way valve 38 by conduits 39 and 41 and the valve unit 38 is connected to the storage container 32 by conduit 42. The container 32 is connected to the pendulum controlled valve unit 29 of the present invention by conduit 43.

Pumps, valves, and actuators for vacuum powered brake systems are well known in the automotive industry. The function of the dual check valve 38 is to coordinate the operations of the intake manifold 33 and the pump 36 so that vacuum will be maintained under heavy load conditions on the engine when the manifold pressure may increase to approximately 5 inches Hg or less. The pump 36 will normally maintain a relatively high vacuum in the order of 28 inches but is not designed or intended to supply all of the vacuum required but rather is intended to work in conjunction with the engine manifold vacuum and maintain full vacuum power during periods when the engine manifold vacuum is low. These vacuum systems are well known in the art.

In keeping with the vacuum power operation of the system, the several actuators 22—25 are of conventional power chamber design adapted for vacuum operation and are obtainable commercially. A cross-section through one of the vacuum actuators is illustrated in Figure 3 and the unit includes a housing 44 defining an internal chamber 46, a diaphragm 47 medially across the chamber and operatively connected to a pull rod 48 which is attached to the diaphragm by a pair of opposed reinforcing plates 49 and 51. A cable may be substituted for a solid rod. Where a rod is used, as here shown, the diaphragm is subjected to thrust in both directions and in such case a pair of reinforcing plates mounted on opposite sides of the diaphragm, as here illustrated, is preferred.

Typical connections of the vacuum actuators to the front and rear suspensions of an automotive vehicle are illustrated in Figures 2 and 3 of the drawing. As will be understood, there are a number of designs and types of wheel suspensions providing a resilient mounting of the chassis and it is intended that the suspension system of the present invention will work with all of them.

A typical coil spring front end suspension is shown in Figure 3. In the suspension illustrated at 17 a coil spring 52 is mounted vertically and with its base nested in and supported by a horizontally arranged spring rest 53, here fashioned as a link pivoted at one end 54 to the vehicle frame 56. The opposite end of the member 53 is pivoted as at 57 to the lower end of a vertical link 58, which supports the wheel 12, and is in turn pivoted at its upper end as shown at 59 to a top horizontal link 61 which is in turn pivotally secured as at 62 to the frame 56, it being noted that the upper end of spring 52 is supported in a spring rest 63 fashioned by the frame. In this form of suspension, the pull rods 48 may be secured at their lower end to the pivot 59 as here illustrated. For proper positioning of the actuators 22 and 23 for connection as described, they may be mounted on thrust brackets 64 and 66 secured to the frame 56 for supporting the actuators 22 and 23 against the vertical thrust to which they are subjected in pulling down of the sides 27 and 28 of the vehicle, effecting the above noted righting or leveling action and lowering of the center of gravity.

A typical leaf type rear wheel suspension is shown in Figure 2 where the pull rod 67 (or cable) of actuator 25 may be secured at its lower end to the axle housing 68 at the U-bolt clamp 69 for the conventional type leaf spring 71. The housing for the actuator 25 may be mounted on the frame directly or by any suitable bracket as required.

A single pendulum operated valve control unit 29 is used for the simultaneous actuation of the several actuators 22—25 as required. As here shown in Figure 1, the actuators 22 and 24 mounted at one side 27 of the vehicle chassis are connected by a conduit 72 which interconnects the vacuum chambers of these two units. The vacuum chamber of unit 22 is connected by conduit 73 to one valve mechanism 74 of the unit 29 so that the forward and rear actuators 22 and 24 on side 27 of the chassis are operated together. In a similar fashion, the forward and rear actuators 23 and 25 at the opposite side 28 of the vehicle chassis are connected by a conduit 76 and the vacuum chamber of the forwardly disposed actuator 23 is connected by conduit 77 to a second valve mechanism 78 of the valve control unit 29 so that the two actuator units 23 and 25 on side 28 of the chassis are operated together.

The pendulum operated valve control unit 29 may be conveniently mounted at the front of the vehicle as illustrated in Figures 1, 2, and 3, generally centrally thereof ahead of the radiator 79 but preferably behind the grill 80, so that the pendulum 81 forming part of the unit is carried by the chassis for side to side motion in response to a change in direction of movement of the vehicle or tilting of the vehicle such as when on a bank or subjected to crosswind or the like. The unit including both of the valve mechanisms 74 and 78 and the pendulum 81 may be conveniently mounted by a bracket 82 which provides a support for the bearing 83 for the pendulum. The pendulum 81 here includes a shaft 84 supported by and depending from the pendulum bearing 83 and a pendulum weight 86 adjustably secured to the lower end of shaft 84.

As an important feature of the present invention, each of the valve mechanisms 74 and 78 is composed of small fluid actuators including chambers 91 and 92, see Figure 4, and diaphragms 93 and 94 therein. As above noted, conduits 73 and 77 connect these chambers 91 and 92 to the actuators at the opposite sides of the vehicle chassis. To complete the operating assembly, means 96 and 97 connect the pendulum 81 to the diaphragms 93 and 94 so as to place the pendulum in an equilibrium kind of relation with the actuators 22—25. In this connection, it will be observed that the diaphragms 93 and 94 are much smaller in area than the actuator diaphragms so that a relatively small force at the pendulum will be reflected as a relatively great force at the larger actuator diaphragms, thereby enabling the pendulum to accurately and precisely hold the larger actuator diaphragms in place with both great force and precision. Coupled with this important equilibrium relationship between the pendulum and the actuators 22—25 is the important functioning of valve means 98 for connecting the source 31 to the valve chambers 91—92 as power from the source is required to assist the pendulum 81. As here shown, the valve means 98 is carried by the diaphragm 93 and is thus rendered not only responsive to the side to side movements of the pendulum, but also rendered pressure responsive so as to provide an important function in the control system. As will be observed from Figure 4, the valve means 98 is mounted on the vacuum side of the diaphragm 93, that is, within the vacuum chamber 91, and thus the power source is applied to the diaphragm in a manner tending to restore the valve to a closed position, and also tending to restore the pendulum to its vertical center position, thereby holding the pendulum under control and not permitting it to swing wildly from side to side. As here shown, the housing 99 for the valve unit 74 is formed with a valve seat 101 in the chamber 91 in surrounding relation to a vacuum passage 102 provided by conduit 103 at the top of the housing, generally centrally of the diaphragm 93. A valve supporting member 104 provided with a base flange 106 is here mounted on the diaphragm and carries a valve 107 for movement to and from the seat 101 for respectively closing and opening the source connection to chamber 91. Connection of the pendulum to the diaphragm is here effected by a reinforcing member 108 having a flange 109 mounted at the under side of the diaphragm 93 and secured as by bolts 111 to the base flange 106 of the valve carrier 104.

As another feature in the operation of the valve control unit a second valve means 112 is carried by the diaphragm 93 and functions to open and close connection of chamber 91 to the atmosphere, and is correlated in its operation with the operation of valve 107 so as to relieve the vacuum in the actuators 22—25 when the pendulum returns to its vertical center position. Accordingly the pendulum connecting means 96 is arranged to effect a proper sequential movement of valves 112 and 98. As here shown, the valve member 104 and the reinforcing member 108, on opposite sides of the diaphragm 93, cooperate to provide a valve chamber 114 having a passage 116 at the upper side of diaphragm 93 connected to the vacuum chamber 91 and a second passage 117 extending from the underside of the diaphragm and communicating with the atmosphere. A valve seat 118 is provided in the chamber in surrounding relation to the atmospheric passage 117, and the valve 112 is mounted within the chamber for movement to and from the seat 118 to open and close the passage 117. As will be observed, the valve seat 118 is arranged on a substantially horizontal plane and the valve 112 is mounted for movement vertically to and from the seat. Accordingly, the pulling down of valve 112 onto seat 118 to close passage 117 also provides a mechanical connection for pulling down on the diaphragm of 93 and opening valve 107. Thus by connecting the pendulum to valve 112 a proper sequential operation of the valves may be effected.

Spring means is provided for normally urging valve 107 to closed position, and valve 112 to open position. As here shown, a helical spring 121 is mounted in compression between the underside 122 of the diaphragm supporting member 108 and a spring rest 123 provided on a lower section 124 making up the housing 99 so as to constantly urge the diaphragm 93 upwardly to a closed position of valve 107. A second helical spring 126 is mounted in compression between the underside of valve 112 and a spring rest 127 provided by member 108 so as to constantly urge valve 112 to a raised open position.

The detailed description of the valve apparatus 74 applies equally to the valve mechanism 78 which is mounted in generally horizontally spaced relation with respect to the unit 74 and above and to the opposite side of the pendulum bearing 83. The two units may be supported as here shown on the top wall 131 of an air filtering housing 132 which may be packed with a suitable air-filtering material. In this manner, atmospheric air may be drawn through the perforated periphery 133 of the housing and into the bottom sections 124 and 125 of the valve units for control of the valve 112 of unit 74 and corresponding valve 134 of unit 78. Opening and closing of these valves is effected by depending valve stems 136 and 137 which extend downwardly into the filter housing 132 for vertical displacement by the pendulum connection 96 and 97. As here shown, the upper end of the pendulum adjacent bearing 83 is fashioned as a vertical quadrant type plate 138 providing a pair of cam members 139 and 141 having curved surfaces 142 and 143 which are arcuately related to the bearing 83 adjacent the pendulum shaft 84 and extend outwardly from the shaft and upwardly on opposite sides of and symmetrical to the axis of the shaft so that the upper extremities of the curved surfaces are generally vertically arranged. The connection means 96 and 97 here consist of a pair of flexible metal straps which are secured at their lower ends 146 and 147, as by rivets 148, on the surfaces 142 and 143 adjacent the pendulum shaft 84 and extend upwardly over the surfaces and are secured at their upper ends 151 and 152 to the lower ends of depending valve stems 136 and 137 of valves 112 and 134.

The several parts of the pendulum operated valve control unit are so proportioned that when the pendulum is in a vertical center position, valve 107 of unit 74 will be closed and the corresponding valve 156 of unit 78 will likewise be closed. On the other hand, both of the atmospheric valves 112 and 134 will be opened. As the lower end of the pendulum is swung to the right as when making a right or clockwise turn, see Figure 4, valve 112 will be drawn downwardly to its seat 118, thereby closing off the atmospheric connection to the chamber 91 and pulling down on the diaphragm 93 and thereby opening valve 107 so as to connect chamber 91 with the vacuum source 31 through conduits 103 and 43. The vacuum power is thus applied to actuators 22 and 24 at the side 27 of the chassis to pull down this side to effect a righting or leveling action. The sub-atmospheric pressure in chamber 91 will tend to pull up on diaphragm 93 so as to restore valve 107 to closed position and pendulum 81 to its vertical center position. If the centrifugal force which actuated the pendulum has not subsided, valve 112 will remain closed so that actuators 22 and 24 will be held fast in their energized position. If the centrifugal force or the sidewise thrust on the pendulum increases, valve 107 will again be opened to admit further vacuum power to the actuators 22 and 24. After the centrifugal force or lateral thrust on the pendulum has subsided and the latter returns to its vertical center position, valve 112 will open to admit atmospheric pressure to actuators 22 and 24. As will be observed during this rightward movement of the pendulum, valve 156 of valve unit 78 remains closed and valve 134 remains open so that the operation of the actuators 23 and 25 at the opposite side of the vehicle are unaffected. Thus in rounding a clockwise turn, the spring suspension at the outer side 28 of the vehicle will be compressed by actuators 22 and 24 so as to pull down this side of the vehicle and thus control not only its poise but also lower its center of gravity while going through the turn. If desired, the actuation of the system may be set to produce a tilting or banking effect while going through the turn.

In a similar manner, the rounding of a turn in a left or counterclockwise direction will be accompanied by a movement of the pendulum 81 to the left as viewed in Figure 4. In this case, valve 107 will remain closed and valve 112 will remain open so as to leave the actuators 22 and 24 at the right side 27 of the vehicle unactivated. On the other hand, valve 134 of the other control unit 78 will be closed and valve 156 of this unit opened so as to apply vacuum power to the actuators 23 and 25 at the inside 28 of the curve, which accordingly will be energized to pull down this side of the chassis into level relation with, or if desired below, the outer chassis side 27 which has been lowered by a shifting of the weight of the vehicle in accordance with the amount of centrifugal force generated in rounding the turn.

With reference to Figure 4, it will be seen that atmospheric air pressure is admitted to the chamber 161 at the underside of the diaphragm 93 from the interior of the filter housing 132. As here shown the lower section 124 of the housing 99 is mounted directly on the top wall 131 of the filter housing and is formed with a depending cylindrical portion 162 which extends down into the housing 132 in surrounding relation to spring 121 and is formed with an inturned flange providing the spring rest 123 and also an opening 163 serving to admit air into the interior of the housing section 124, the opening 163 further serving to accommodate the extension from the housing of the lower end of valve stem 136. The metal strap 96 secured to the valve stem may be extended through an opening formed in a felt plug 157 mounted in the bottom wall 158 of the filter housing. Any suitable fibrous filter material, such as used in conventional air cleaners for internal combustion engines, may be used in the housing.

The control unit 78 may be mounted on the top wall 131 of the filter housing and connected to the pendulum 81 in the same manner as unit 74. The mounting bracket 82, filter housing 132, control valve units 74 and 78 and their connecting vacuum intake conduit 103 thus provide a unitary structural assembly.

The lower ends 146 and 147 of the metal straps 96 and 97 adjacent their point of attachment to the curved surfaces 142 and 143 are subjected to a certain amount of bending or flexure. In order to keep this to a small amount and to prevent sharp bending of these end portions, there is provided adjacent their points of attachment a pair of metal clips 166 and 167 which, as will be observed in Figures 3 and 4, curve upwardly and away from the curved surfaces 142 and 143 in spaced relation to the straps so as to confine the straps to a restricted movement near their point of attachment and to support the end portions against making a short or sharp bend when in a slack position.

I claim:

1. A vehicle suspension system comprising, a vehicle chassis including transversely spaced wheels and resilient suspensions therefor, a vacuum source, a pair of vacuum actuators each including a chamber and a diaphragm therein operatively connected to one of said resilient suspensions and cooperating therewith for selectively controlling the vertical spacing between said chassis and wheels at the opposite transverse sides of said chassis, a pair of valves normally biased to closed position connected to said source and said actuators for energizing the latter, a pendulum carried by said chassis and mounted to swing from side to side in response to the rate of change of direction of movement of said vehicle, first means connecting said pendulum to said valves to operate said actuators in a manner lowering said chassis on the inside of the curve constituting said change in direction, and second means operatively connected to said first means tending to restore said valves to closed position to operate said actuators in a manner restoring said chassis to its normal position as said pendulum returns to its center position.

2. A vehicle suspension system comprising, a vehicle chassis including transversely spaced wheels and a resilient suspension therefor, a first fluid actuator including a chamber and a diaphragm operatively connected to said resilient suspension and cooperating therewith for selectively controlling the vertical spacing between said chassis and wheels at the opposite transverse sides of said chassis, a second fluid actuator including a chamber and a diaphragm therein, a conduit connecting said chambers to provide a closed fluid system, a pendulum carried by said chassis and mounted to swing from side to side in response to a change in direction of movement of the vehicle, and means connecting said pendulum to said second named diaphragm to produce oscillation of said diaphragm in accordance with the side to side movement of said pendulum.

3. A vehicle suspension system comprising, a vehicle chassis including transversely spaced wheels and a resilient suspension therefor, a fluid power source, a first fluid actuator including a chamber and a diaphragm therein operatively connected to said resilient suspension and cooperating therewith for selectively controlling the vertical spacing between said chassis and wheels at the opposite transverse sides of said chassis, a second fluid actuator including a chamber and a diaphragm therein, a conduit connecting aid chambers to provide a closed fluid system, a pendulum carried by said chassis and mounted to swing from side to side in response to a change in direction of movement of the vehicle and being operatively connected to said second diaphragm to effect displacement thereof in accordance with said side to side movement, and valve means connecting said source to said closed system and being connected to said pendulum for opening and closing of said valve means in accordance with said pendulum movement.

4. A vehicle suspension system comprising, a vehicle chassis including transversely spaced wheels and a resilient suspension therefor, a fluid power source, a first fluid actuator including a chamber and a diaphragm therein operatively connected to said resilient suspension and cooperating therewith for selectively controlling the vertical spacing between said chassis and wheels at the opposite transverse sides of said chassis, a second fluid actuator including a second chamber and a second diaphragm therein, a conduit connecting said chambers, a pendulum carried by said chassis and mounted to swing between a vertical center position and a sidewise displaced position in response to a change in direction of movement of the vehicle and being operatively connected to said second diaphragm to effect displacement thereof, a second conduit connecting said source to said second chamber, and valve means associated with said second conduit for opening and closing the source connection to said second chamber, said valve means being connected to said second diaphragm for opening upon movement of said pendulum to its sidewise displaced position and for closing upon movement of said pendulum to its center position, said power source being applied to said second diaphragm in a manner tending to restore said valve to closed position and said pendulum to its center position.

5. A vehicle suspension system comprising, a vehicle chassis including transversely spaced wheels and resilient suspenions therefor, a fluid power source, first and second fluid actuators each including a chamber and a diaphragm therein operatively connected to one of said resilient suspensions and cooperating therewith for selectively controlling the vertical spacing between said chassis and wheels at the opposite transverse sides of said chassis, third and fourth fluid actuators each including a second chamber and third and fourth diaphragms therein, a pair of conduits connecting said first and third chambers and said second and fourth chambers, a pendulum carried by said chassis and mounted to swing from a vertical center position to first and second sidewise displaced positions in response to a change in direction of movement of the vehicle and being operatively connected to said third and fourth diaphragms to effect displacement thereof in accordance with said side to side movement, conduit means connecting said source to said third and fourth chambers, and valve means associated with said conduit means for opening and closing the source connection to said third and fourth chambers, said valve means being connected to said third and fourth diaphragms for opening said fluid connection to said third and fourth chambers upon movement of said pendulum to its first and second sidewise displaced positions respectively and for closing said source connections upon movement of said pendulum to its center position, said power source being applied to said third and fourth diaphragms in a manner tending to restore said valve means to closed position and said pendulum to its center position.

6. A vehicle suspension system comprising, a vehicle chassis including transversely spaced wheels and a resilient suspension therefor, a vacuum power source, a first fluid actuator including a chamber and a diaphragm therein operatively connected to said resilient suspension and cooperating therewith for selectively controlling the vertical spacing between said chassis and wheels at the opposite transverse sides of said chassis, a second fluid actuator including a second chamber and a second diaphragm therein, a conduit connecting said chambers, a pendulum carried by said chassis and mounted to swing from a vertical center position to a sidewise displaced position in response to a change in direction of movement of the vehicle, a valve seat formed in said second chamber, conduit means connecting said valve seat to said source, a valve carried by said second diaphragm and movable to and from said seat for respectively closing and opening the source connection to said second chamber, and means connecting said pendulum to said valve to provide the opening of said valve upon movement of said pendulum to its sidewise displaced position and for closing said valve upon movement of said pendulum to its center position, said power source being applied to said second diaphragm in a manner tending to restore said valve to closed position and said pendulum to its center position.

7. A vehicle suspension system comprising, a vehicle chassis including transversely spaced wheels and a resilient suspension therefor, a fluid power source, a first fluid actuator including a chamber and a diaphragm therein operatively connected to said resilient suspension and cooperating therewith for selectively controlling the vertical spacing between said chassis and wheels at the opposite transverse sides of said chassis, a second fluid actuator including a second chamber and a second diaphragm therein, a conduit connecting said chambers, a pendulum carried by said chassis and mounted to swing from a vertical center position to a sidewise displaced position in response to a change in direction of movement of the vehicle, a conduit connecting said source to said second chamber, first valve means carried by said second diaphragm and movable therewith for opening and closing the source connection to said second chamber, second valve means carried by said second diaphragm and functioning to open and close connection of said second chamber to the atmosphere, and means connecting said pendulum to said second and first valve means to provide upon movement of said pendulum to its sidewise displaced position the opening of said first valve means and the closing of said second valve means and upon movement of said pendulum to its center position the closing of said first valve means and the opening of said second valve means.

8. A vehicle suspension system comprising, a vehicle chassis including transversely spaced wheels and a resilient suspension therefor, a vacuum power source, a first fluid actuator including a chamber and a diaphragm therein operatively connected to said resilient suspension and cooperating therewith for selectively controlling the vertical spacing between said chassis and wheels at the opposite transverse sides of said chassis, a second fluid actuator including a second chamber and a second diaphragm therein, a conduit connecting said chambers, a pendulum carried by said chassis and mounted to swing from a vertical center position to a sidewise displaced position in response to a change in direction of movement of the vehicle, a valve seat formed in said second chamber, conduit means connecting said valve seat to said source, a first valve carried by said second diaphragm and movable to and from said seat for respectively closing and opening the source connection to said second chamber, said valve being formed with a valve chamber having a passage communicating said second chamber with the atmosphere, a second valve mounted in said valve chamber and movable to open and close said passage, spring means normally urging said first valve to closed position and said second valve to open position, said second valve in closed position providing a mechanical connection for opening said first valve, and means connecting said pendulum to said second valve to provide upon movement of said pendulum from it center position to its sidewise displaced position for the successive closing of said second valve and opening of said first valve and upon movement of said pendulum from its sidewise displaced position to its center position the successive closing of said first valve and opening of said second valve, said power source being applied to said second diaphragm in a manner tending to restore said first valve to closed position and said pendulum to its center position.

9. A vehicle suspension system comprising, a vehicle chassis including transversely spaced wheels and resilient suspensions therefor, a vacuum power source, first and second fluid actuators including first and second chambers and first and second diaphragms therein operatively connected to said resilient suspensions and cooperating therewith for selectively controlling the vertical spacing between said chassis and wheels at the opposite transverse sides of said chassis, third and fourth fluid actuators including third and fourth chambers and third and fourth diaphragms therein, a conduit connecting said first and third chambers, a conduit connecting said second and fourth chambers, a pendulum carried by said chassis and mounted to swing from a vertical center position to first and second sidewise displaced positions in response to a change in direction of movement of the vehicle, valve seats formed in said third and fourth chambers, conduit means connecting said valve seats to said source, first and second valves carried by said third and fourth diaphragms and movable to and from said seats for respectively closing and opening the source connections to said third and fourth chambers, said first and second valves being formed with valve chambers having passages communicating said third and fourth chambers with the atmosphere, third and fourth valves mounted in said valve chambers and movable to open and close said passages, spring means normally urging said first and second valves to closed position and said third and fourth valves to open position, said third and fourth valves in closed position providing mechanical connections for opening said first and second valves, and means connecting said pendulum to said third and fourth valves to provide in said center position of said pendulum a closing of said first and second valves and an opening of said third and fourth valves and on movement of said pendulum to said first sidewise position a successive closing of said fourth valve and opening of said second valve and upon movement of said pendulum to its second sidewise displaced position the successive closing of said third valve and opening of said second valve, said power source being applied to said third and fourth diaphragms in a manner tending to restore said first and second valves to closed positions and said pendulum to its center position.

10. A vehicle suspension system as characterized in claim 9 wherein said pendulum includes a shaft depending from a pendulum bearing arranged centrally between and below said third and fourth chambers, said third and fourth valves being mounted for vertical movement, a pair of cam members secured for movement with said shaft and having curved surfaces arcuately related to said bearing adjacent said shaft and extending outwardly and upwardly on opposite sides of and symmetrical to the axis of said shaft, and flexible metal straps secured at their lower ends to said surfaces adjacent said shaft and extending upwardly over said surfaces and being secured at their upper ends to said third and fourth valves.

11. A control unit for a vehicle suspension system of the character described comprising, a pendulum having a bearing and a pendulum shaft depending therefrom, a pair of valve units having vertically displaceable valve parts positioned on opposite sides of the axis of said shaft, a pair of cam members secured for movement with said shaft and having curved surfaces arcuately related to said bearing adjacent said shaft and extending outwardly and upwardly on opposite sides of and symmetrical to the axis of said shaft, and flexible metal straps secured at their lower ends to said surfaces adjacent said shaft and extending upwardly over said surfaces and being secured at their upper ends to said valve parts for displacement thereof on side to side movement of said pendulum.

References Cited in the file of this patent

UNITED STATES PATENTS

| | | |
|---|---|---|
| 2,165,617 | Paes | July 11, 1939 |
| 2,404,281 | Eaton | July 16, 1946 |

FOREIGN PATENTS

| | | |
|---|---|---|
| 1,085,479 | France | July 28, 1954 |
| 670,361 | Great Britain | Apr. 16, 1952 |